(12) United States Patent
Morgan et al.

(10) Patent No.: US 8,560,654 B2
(45) Date of Patent: Oct. 15, 2013

(54) CHANGE MANAGEMENT

(75) Inventors: Jeffery A. Morgan, Cupertino, CA (US); Chandrasekar Venkatraman, Saratoga, CA (US); John C. Schettino, San Jose, CA (US)

(73) Assignee: Hewlett-Packard Development Company, Houston, TX (US)

( * ) Notice: Subject to any disclaimer, the term of this patent is extended or adjusted under 35 U.S.C. 154(b) by 874 days.

(21) Appl. No.: 11/701,689

(22) Filed: Feb. 2, 2007

(65) Prior Publication Data

US 2008/0189702 A1    Aug. 7, 2008

(51) Int. Cl.
*G06F 9/00*    (2006.01)

(52) U.S. Cl.
USPC ........................................................ 709/223

(58) Field of Classification Search
USPC .................. 709/223–226; 718/100
See application file for complete search history.

(56) References Cited

U.S. PATENT DOCUMENTS

| 7,143,087 | B2 | 11/2006 | Fairweather |
| 7,509,372 | B2 * | 3/2009 | Dutta et al. .................. 709/203 |
| 7,631,260 | B1 * | 12/2009 | Riggs et al. .................. 715/716 |
| 2005/0198061 | A1 * | 9/2005 | Robinson et al. ............. 707/102 |
| 2007/0022174 | A1 * | 1/2007 | Issa ............................... 709/217 |
| 2007/0050630 | A1 * | 3/2007 | Kumar et al. ................. 713/182 |
| 2008/0037438 | A1 * | 2/2008 | Twiss et al. ................... 370/252 |
| 2008/0133650 | A1 * | 6/2008 | Saarimaki et al. ............ 709/203 |
| 2008/0235331 | A1 * | 9/2008 | Melamed et al. ............. 709/204 |

* cited by examiner

*Primary Examiner* — Joseph E. Avellino
*Assistant Examiner* — Thai Nguyen

(57) ABSTRACT

A system for providing a change management service (CM) to at least one client therein is provided. The system includes a peer-to-peer (P2P) system imposed on the network system, wherein the at least one client is a peer in the P2P system, a syndication feed operable to provide a notification of the CM service to the at least one client, and at least one host operable as a source in the P2P system to provide the CM service to the at least one client through the imposed P2P system.

17 Claims, 6 Drawing Sheets

CHANGE MANAGEMENT

BACKGROUND

A major issue in a shared services environment or system having multiple members is the ability to sufficiently provide the shared services to such clients. This is especially true for a network system, such as an information'technology (IT) enterprise-wide network or system, wherein shared services typically involve the transfers of large amounts of data or content to and from the system members. As referred herein, and as understood in the art, information technology, or IT, encompasses all forms of technology, including but not limited to the design, development, installation, and implementation of hardware and software information systems and software applications, used to create, store, exchange and utilize information in its various forms including but not limited to business data, conversations, still images, motion pictures and multimedia presentations technology and with the design, development, installation, and implementation of information systems and applications.

In the case of a shared services system that manages and provides services to the system members therein, there are typically functional components or contents that need to be deployed and distributed to system members within a management domain of such a system. For example, a management service such as change management in an IT enterprise-wide network may require support for the deployment of potentially large amounts of content to a large number of members in the IT enterprise-wide network, such as network hosts, clients, virtual machines and appliances. As referred herein, change management is a planned or organized approach to providing the desired or necessary changes within a system for one or more of its hosts, clients, or both. For example, change management in an IT enterprise-wide network system may be a software configuration management which manages the distribution of software patches or updates, security patches or updates, and configuration information and management software to one or more members in the IT enterprise-wide network or system.

Often, there are cases where the source, or seed, of a large amount of content (e.g., a software upgrade content) required for a managed change (e.g., a software configuration change) is sitting in a data network (e.g., Internet). In such cases, there is a desire to avoid what is known as the "slashdot effect," whereby the content source or seed is inundated with multiple requests for the same popular content. This slashdot effect creates scalability problems for traditional methods of delivering content, such as software updates, to running systems. That is because in a traditional method for content delivery, the contents are centralized at one or more hosts that act as servicing hubs. Thus, services are provided from the content hosts to those clients connected to such hosts. Each content host must then have sufficient computing power and bandwidth to accommodate servicing requests from those clients connected thereto. As more clients are connected to the hosts or the size of the content delivery increases, infrastructure costs are incurred to necessarily upgrade the hosts to be powerful and to have higher system bandwidth to handle the increased content requirements. This scalability problem is especially pronounced in, for example, an IT enterprise-wide network or data center that employs machine virtualization. In such a system, while there are only a few thousand nodes in the IT enterprise-wide network, such nodes may effectively run tens of thousand of virtual nodes that all need the same content, such as updates to the latest software application or operating system (OS). This kind of scale creates a localized slashdot effect within the IT enterprise-wide network.

Peer-to-peer, or P2P, file sharing technologies long have been used to support the sharing of large amounts of content between a potentially large community of nodes or users. Torrent-based P2P file sharing systems, such as BitTorrent, KTorrent, μTorrent, and BitComet, have emerged as systems of choice for distributing very large amounts of content across a data network such as the Internet. These P2P systems have allowed non-profit and open source organizations to avoid deploying large server farms and instead rely on a small number of mirror sites that know they won't get totally inundated with massive amounts of download requests.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for employing a torrent-based P2P distribution model, such as BitTorrent, as part of a change management tool or platform to provide efficient and effective change management of a given system, such as an IT enterprise-wide network. According to various embodiments of the present invention, the change management (CM) tool is scalable to provide CM services to shared services systems of different sizes. Thus, the CM tool can provide CM services, such as disseminating content, to multiple system members at a faster rate without the need to increase bandwidth and associated cost on the servicing hosts. The scalability of the change management tool also allows it to accommodate a machine virtualization system wherein services may need to be provided to multiple virtual machines inside each physical ones.

Figure 1:
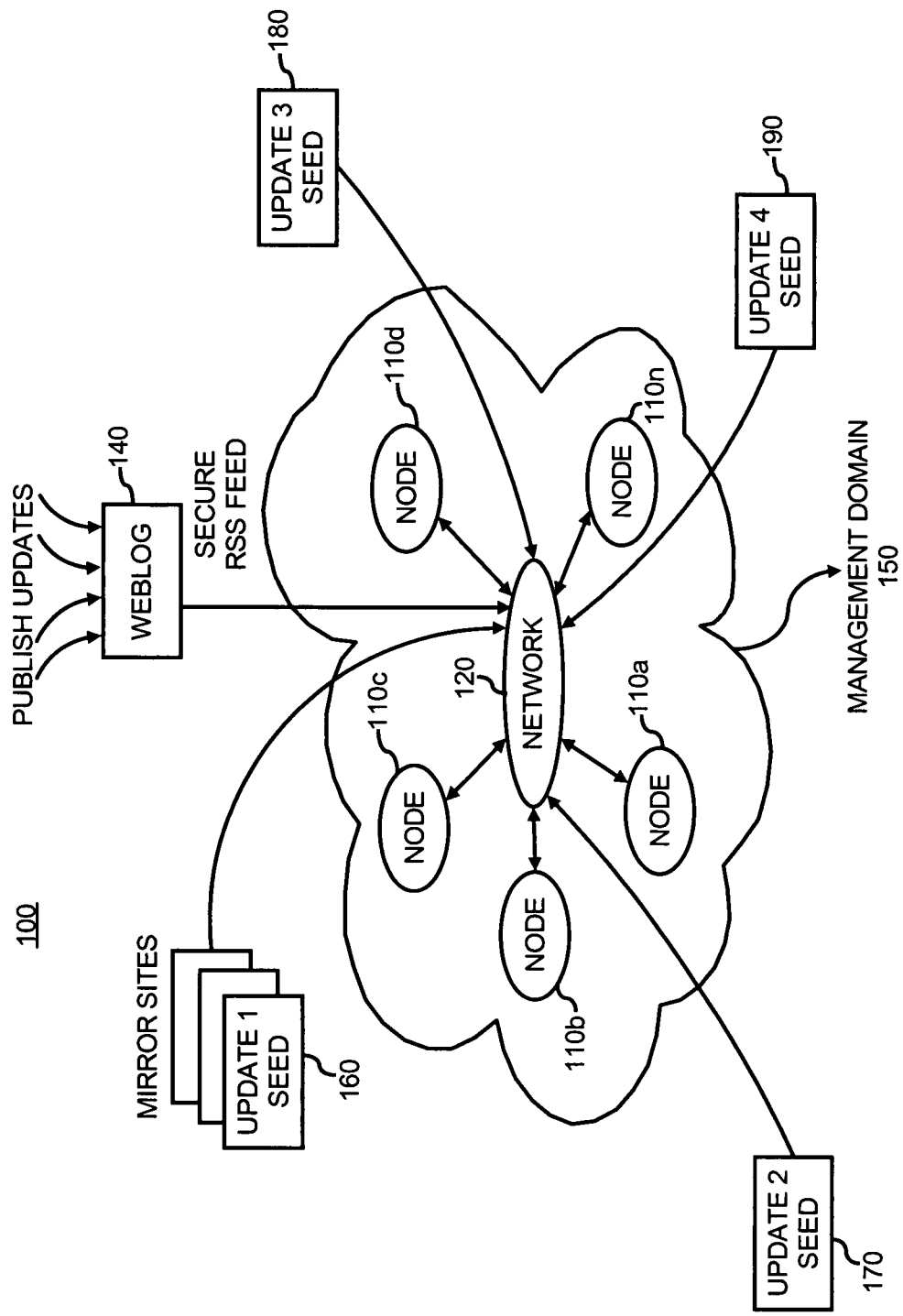
FIG. 1 illustrates an exemplary block diagram of a system for providing change management, in accordance with one embodiment.

FIG. 1 illustrates an exemplary block diagram of a system 100, such as an IT enterprise-wide network, wherein an embodiment of the present invention may be practiced. It should be readily apparent to one of ordinary skill in the art that the system 100 represents a generalized schematic illustration and that other components may be added or existing components may be removed or modified without departing from the spirit or scope of the present invention.

The system 100 includes a plurality of nodes 110a-n. Imposed on the system 100 is a torrent-based P2P system with the nodes 110a-n forming peers therein, in accordance with one embodiment. The nodes 110a-n are operable to exchange information among themselves and with other network nodes over a network 120. The nodes 110a-n may be physical or virtual computing platforms (e.g., personal digital assistants, laptop computers, workstations, servers, multiple virtual machines hosted on one or more physical machines, and other similar devices) in a managed system. Each of the nodes 110a-n also may be a managed system having other nodes therein. The nodes 110a-n are operable to execute one or more software applications (not shown) that include the capability to share information (e.g., data, applications, etc.) in a P2P manner as further discussed later.

The network 120 is operable to provide a communication channel among the nodes 110a-n. The network 120 may be implemented as a local area network (LAN), a wide area network (WAN), or any combination thereof. The network 120 may implement wired protocols, such as Ethernet, token ring, etc., wireless protocols, such as cellular digital packet data, Mobitex, IEEE 801.11 family, Bluetooth, Global System for Mobiles, etc., or any combination thereof.

In one embodiment, a CM tool is employed in the system 100 to facilitate delivery of CM services, such as disseminating software updates or patches, from CM service providers to a given management domain 150 and the nodes 110a-n therein. A CM service provider may be an administrator of the system 100 or any other entity authorized to provide CM services to the management domain 150. The CM tool provides one or more CM hosts 160-190, each functioning as a source, or seeder, of one or more CM services that may be available to the managed nodes 110a-n via the network 120. The CM hosts 160-190 may be computing platforms, as noted above, that have a network interface for communication with the network 120. The CM hosts 160-190 are operable to execute one or more software applications (not shown) that include the capability to store and share information in a P2P manner as further discussed later. Thus, the CM hosts 160-190 are also peers in the torrent-based P2P system that is imposed on the system 100. A CM service provider may implement and maintain one or more of the CM hosts 160-190 so as to provide one or more CM services from each CM host. Each of the CM hosts 160-190 may further include one or more mirror sites to provide redundant or backup sources of CM services to accommodate additional nodes in the management domain 150, in a manner known in the art for such mirror sites. The CM operations in the system 100 is further discussed below with reference to an example in which a provided CM service is a software updating service being provided from the CM host 160 by the CM tool to the nodes 110a-n. However, it should be understood that such a discussion is also applicable for cases where other types of CM services are provided to the nodes 110a-n by one or more of the CM hosts 160-190.

According to various embodiments, notifications or announcements of CM services, such as software updates, are published by one or more CM service providers through a web feed or a syndication feed 140 (hereinafter, "CM service feed") to a managed domain. Thus, the nodes 110a-n are subscribers to the web feed because they belong to the managed domain 150. They are also clients in the system 100 for receiving CM services. As understood in the art, a web or syndication feed is a data format used for serving frequently updated content (e.g., blogs, news feeds, or podcasts) to users. Examples of a web feed include but are not limited to an XML structured feed, such as an Atom feed, and any RSS feed based on the family of RSS feeds (e.g., Really Simple Syndication or RSS 2.0, Rich Site Summary or RSS 0.91 and 1.0, or resource-description-framework, or RDF, Site Summary or RSS 0.9 and 1.0). FIG. 1 illustrates the CM service feed 140 as a weblog or "blog." However, it should be understood that the CM service feed 140 may be in any other suitable format. For the aforementioned software updating example, the CM service feed 140 is hereinafter called an update-notification feed for discussion purposes and not to be limited to such a name. The update-notification feed 140 encodes the update notifications into feed items, which contain the necessary information for each of the nodes 110a-n in the managed domain 150 to determine which updates are appropriate for it. Feed subscription is secure so that the managed nodes 110a-n are ensured that the update notifications are coming from a trusted source. The actual software updates themselves are located at the hosts 160-190 and available for download to the managed nodes 110a-n. One or more of the hosts 160-190 may be maintained by one or more CM service providers to provide the CM services notified or announced by the CM service providers. In a torrent-based P2P system, the hosts 160-190 are the seeders or full peers, and the managed nodes 110a-n are initially the empty peers or leechers of a P2P torrent that is created for each software update notification. As referred herein, a seeder or full peer is a peer in a P2P system that has a complete copy of a particular content, such as a software update, and offers it for downloads by others in the peer. Whereas, an empty peer or a leecher is a peer in a P2P system that does not have a complete copy of a particular content and operates to only download such particular content.

Each of the managed nodes 110a-n is provided with a client software agent (hereinafter, "client agent") that serves as a CM service agent. For the aforementioned software-updating example, the client agent is hereinafter called an update agent for discussion purposes and not to be limited to such a name. The update agent includes a feed aggregator (or reader) and a torrent agent. A torrent-based P2P system is created in the managed domains 150 based on the torrent agents provided at each of the nodes 110a-n. The update-notification feed 140 may include a plurality of notifications of software updates for different software programs. Thus, the feed aggregator operates to monitor or browse the update-notification feed 140 for notification or announcement of one or more software updates appropriate for the managed node, for example, node 110a, in which the update agent resides and operates. The feed aggregator accesses the information in the update-notification feed 140 to choose the appropriate software update(s) based on a number of criterion, including but not limited to local node configuration, local node environment, and automation policy and administrative command defined by a user at the node or an administrator for the change management services.

When the feed aggregator detects a notification of an appropriate update in the update-notification feed 140, it notifies the torrent agent, which then uses the information in the update-notification feed 140, as provided by the feed aggregator, to contact the appropriate source for the software update, such as one of the hosts 160-190. The contacted host is operable to either provide the software update to the managed node (in which the feed aggregator resides) or refer it to other managed nodes that have already received the update, in accordance with predetermined CM rules or policies. Once the managed node 110a has received the software update, it is also operable to become a full peer or seeder, like the contacted host, for that particular software update. Thus, the file-sharing behavior of the managed nodes 110a-n, which are now peers in a torrent-based P2P system, may be defined so as to measure and control the bandwidth utilization that is maintained by the host 160. Thus, the delivery of CM services may be optimally tuned to provide system scalability and minimize costly infrastructure upgrades, all the while maintaining sufficient infrastructure bandwidth for service deliveries.

Figure 2A:
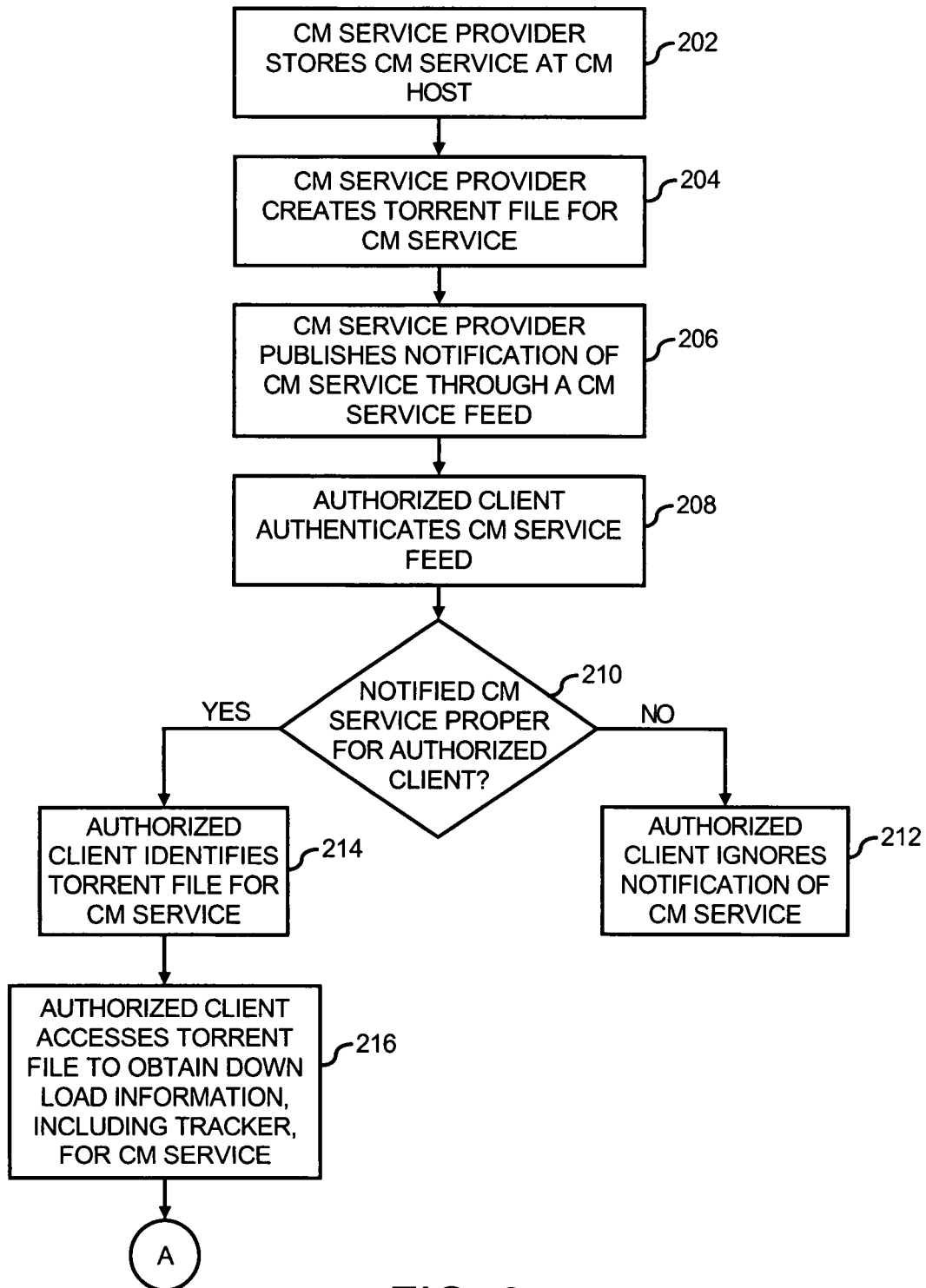
FIGS. 2*a-b* illustrate a method for employing a torrent-based P2P distribution model or system to provide CM services in a desired network system, in accordance with one embodiment.
Figure 2B:
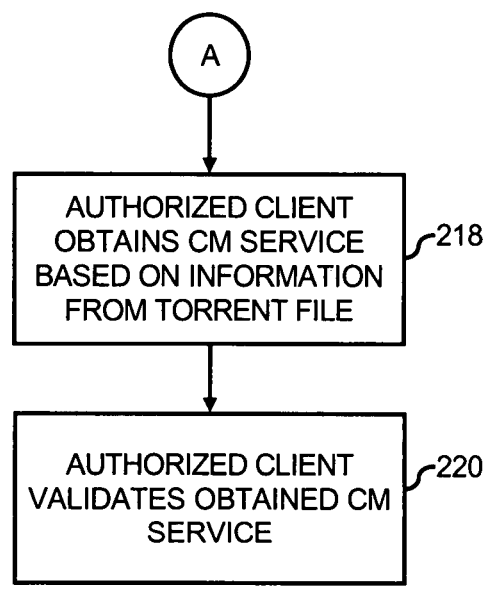
Figure 3A:
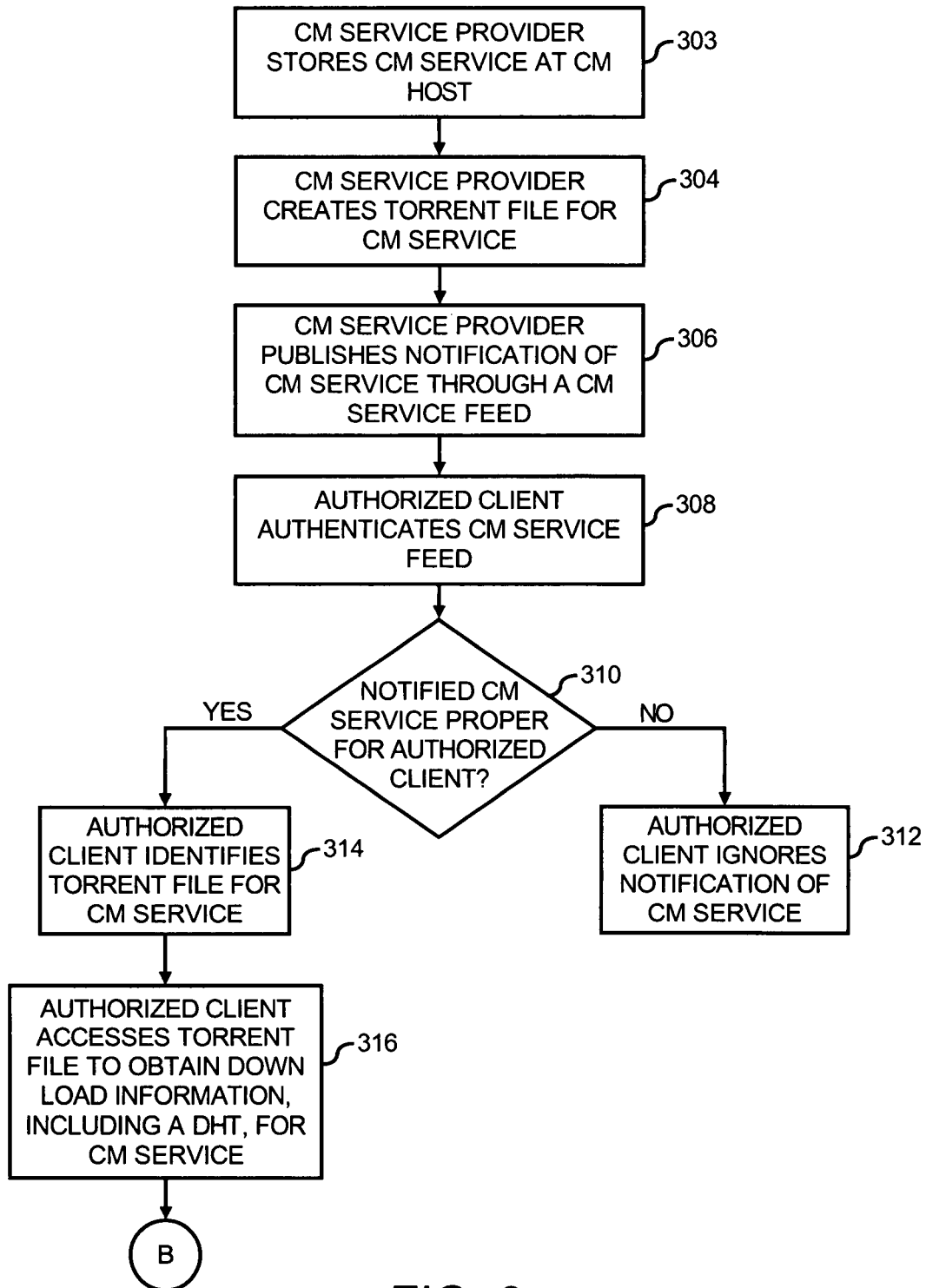
FIGS. 3*a-b* illustrate another method for employing a torrent-based P2P distribution model or system to provide CM services in a desired network system, in accordance with another embodiment.
Figure 3B:
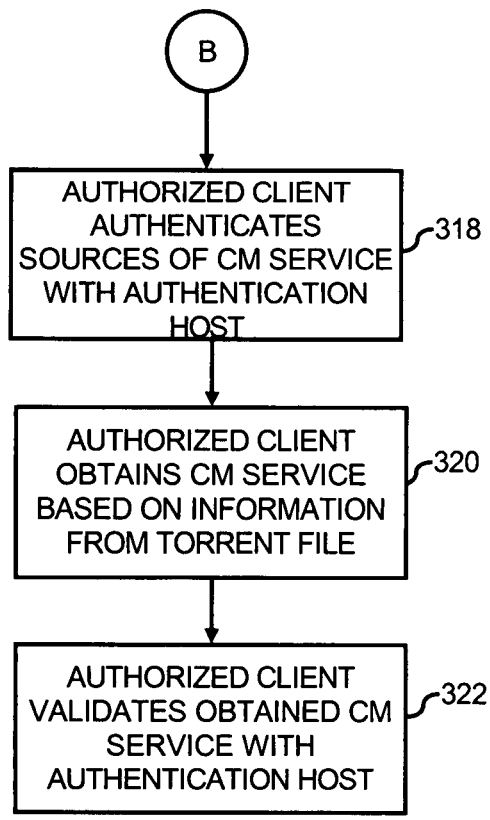

FIGS. 2 and 3 illustrate various methods for employing a torrent-based P2P distribution model or system to provide CM services in a desired network system, such as the system 100, in accordance with various embodiments of the present invention. For illustrative purposes only and not to be limiting thereof, the methods in FIGS. 2 and 3 are discussed in the context of the system 100 illustrated in FIG. 1.

Referring first to the method 200 in FIGS. 2a-b, which employs a tracker-type, torrent-based P2P system or scheme. At 202, a CM service provider wishing to provide a CM service to clients in the system 100 first makes available the CM service at one or more of the CM hosts 160-190. In a running example, a CM service provider may be an administrator of the system 100 that wishes to provide a software update as a CM service to clients in the system 100, whereby the software update may include software update applications or files stored in a CM host 160.

At 204, the CM service provider then creates a torrent file for distribution of the CM service through a torrent-based P2P system. As understood in the art, a torrent file contains metadata about the desired content to download, including, for example, names or identifiers for the data pieces (e.g., files) in the content, their lengths, and the hash code or checksum (or any other security checks) of each data piece. This metadata may be used by the clients in the system 100 to verify the integrity of the data they receive. The torrent file also contains an address or pointer to a tracker, which is a file, server, or any other storage medium that manages the torrent download and assists the clients to find where to obtain the data pieces identified in the torrent file. The tracker is also operable to provide information identifying the initial source or seeder for each torrent file. The torrent file and associated tracker may be located at the same location, such as in the same server like one of the CM hosts 160-190. They are provided and maintained by the CM service provider. In one embodiment, the CM service provider provides a torrent file for each CM service that it offers. For example, if the CM service provider provides multiple software upgrades, it also provides multiple torrent files with a one-to-one correspondence to the multiple software upgrades. Referring to the running example, the CM service provider is the system administrator that creates a torrent file for the software update. This torrent file contains metadata for the software update, such as names of one or more files required for the software update, their lengths, and their checksums. It also contains an address such as a uniform resource locator (URL) for the associated tracker that is associated with the torrent file. In turn, the tracker provides information identifying the CM host 160 as the initial source or seeder that contains the actual software update for download. In one embodiment, both the torrent file and its associated tracker for the software update may reside in the CM host 160. Alternatively, the torrent file and its associated tracker may reside at a location or locations different from the CM host 160.

At 206, the CM service provider publishes a notification or announcement of the available CM service through a CM service feed, which is subscribed by predetermined clients in the system 100. The notification includes a pointer to the torrent file that has been created for the available CM service. Referring to the running example, the system administrator publishes a software-update notification in a weblog 140, through a secure RSS feed, to those clients in the managed domain 150. The RSS feed is secured from unauthorized access in any manner known in the art. For example, the RSS feed may employ hypertext transfer protocol (HTTP) wrapped in a secure sockets layer (SSL) with Basic or Digest Access Authentication (RFC 2617) to encrypt and transmit the weblog 140. Thus, a client is then able to automatically or manually access the RSS feed by entering a login identification (ID) and a password to decrypt the RSS feed. In another example, the RSS feed may employ public key/private key cryptography to encrypt and transmit the weblog 140. Thus, a client may automatically access the RSS feed with a private key. Any other manner known in the art for prevent unauthorized access to or authenticating the RSS feed sender may be employed here as well.

At 208, because those clients that are in the managed domain 150, e.g., the nodes 110a-n, are subscribers to the CM service feed, they are authorized to receive such a feed using a feed aggregator (part of the client agent). Upon accessing the feed, the authorized clients or nodes 110a-n proceed to authenticate or validate the CM service feed to ensure that it is from a proper CM service provider. For example, a node 110a may validate the CM service feed by ensuring that the originating URL for the SSL session of the HTTP for the RSS feed belongs the proper CM service provider, e.g., its centralized server 135. In another example, if public key/private key cryptography is employed for the RSS feed, the public key may be used to provide authentication (via a public key infrastructure or PKI known in the art) of the CM service provider, e.g., its CM host 160, that provides the CM service feed. Referring to the running example, a node 110a receives the RSS feed with the weblog 140 therein and proceeds to authenticate or validate that such a feed originates from the system administrator, e.g., from a URL belonging to the CM host 160.

At 210, once each authorized node in the managed domain 150 authenticates the CM service feed, it possesses the necessary login IDs, passwords, or private key to decrypt the feed. Thus, each of the nodes 110a-n uses its feed aggregator to access the CM service feed to determine whether the feed includes a notification of a CM service that is appropriate for it. As described earlier, this determination may be based on a number of criterion, including but not limited to local node configuration, local node environment, and automation policy and administrative command defined by a user at the node or an administrator for the change management services. In one embodiment, the CM service provider may structure CM service feeds in a hierarchy, wherein a present CM service feed may direct or require the clients to receive one or more other CM service feeds to download other CM services as a prerequisite before it is deemed appropriate for the clients to receive the CM service announced in the present CM service feed.

At 212, if the announced CM service in the CM service feed is not appropriate for the node, no further action is performed by the node to obtain the announced CM service. In the running example, the node 110a determines whether the software update notification in the RSS feed is appropriate for it, such as whether the software update notification is for an update of an existing software at the node and whether the existing software already has been updated. Thus, if the software update announced in the notification is not for an update of an existing software at the node 110a, or that such a software already has been updated, the software-update announcement or notification is ignored by the node 110a.

At 214, if the announced CM service in the CM service feed is appropriate for a node, for example, node 110a, it then identifies the torrent file for the CM service from the announced CM service feed, including an address or pointer to the location of the torrent file. Referring to the running example, the node 110a obtains an address or pointer to the created torrent file for the CM service in the CM host 160 for the software update announced in the RSS feed.

At 216, the node 110a accesses information from the identified torrent file to obtain download information for the CM service in order to request such a CM service. In the running example, the node 110a accesses the torrent file, as found in the CM host 160, to obtain information on the software update announced in the RSS feed. As noted earlier, this information includes metadata about the corresponding content (e.g., files) to download for the software update and a pointer to an associated tracker. As noted earlier, the tracker manages the torrent download and directs the clients to the peers they use to obtain the data pieces identified in the torrent file. Thus, as understood in the art, the tracker contains a list of peers in the torrent-based P2P system that are currently sharing the content, e.g., the CM service content, that is associated with the torrent file and coordinates communication between the shared peers. These shared peers together form a swarm or torrent community that is associated with the torrent file. The swarm also includes the original source, or initial seeder, of the CM service content. In the running example, the node 110a accesses the torrent file in the CM host 160, which points to an associated tracker also in the CM host 160. The tracker provides a swarm of shared peers for the software update, wherein one of the peers is the CM host 160 (or mirror site thereof) as the initial seeder. The swarm also may include any of the nodes 110a-n that have become seeders, after having downloaded part or all of the software update content. The node 110a is then able to request the CM service from the original source or seeder, the CM host 160, from one of the other nodes 110b-n that have turned seeders, or from both.

At 218, the node 110a obtains the CM service from the torrent-based P2P system based on the information found in the associated torrent file, including the source(s) for the CM service listed in the tracker. Referring to the running example, the node 110a downloads the software update content from the swarm or torrent community in accordance with the associated torrent file and tracker, in a manner consistent with content sharing in a torrent-based P2P system. For example, if the node 110a is the first node in the management domain 150 to receive the software update content, it will receive such a content from the initial seeder, the CM host 160. If one or more other nodes in the management domain 150 already received all or a part of the software update content, the node 110a may received such a content from either the CM host 160, the one or more other nodes, or both in accordance with a download policy at the initial seeder, that is, the CM host 160.

In one embodiment, the CM service provider is able to set up the download policy for its initial seeder of the announced CM service, e.g., the CM host 160, as to the number of clients, e.g., the nodes 110a-n, the initial seeder is capable of accepting for concurrent CM servicing, e.g., concurrent downloads of the software update. Thus, the CM service provider is able to leverage the implemented torrent-based P2P system and the download policy to achieve cost saving measures. For example, the CM service provider may set up a download policy that relies more on subsequent seeders in the torrent-based P2P system to provide the content service. Such a download policy may dictate that only a predetermined number of clients can concurrently download content from the initial seeder, with the rest downloading from other seeders, or that after full downloads to a given number of clients, the initial seeder will redirect all download requests to such clients (who have become seeders after the full downloads). Thus, the CM service provider may reduce cost by implementing an initial seeder with lower computing and bandwidth powers than that typically found in a centralized download server of a conventional content delivery system.

At 220, the node 110a may validate the received CM service by comparing information from the received CM service with the metadata about the CM service that is found in the torrent file accessed at 216. Referring to the running example, the node 110a validates the downloaded contents for the software update by comparing the hash code or checksum of each downloaded data piece for the software update, as received from the initial seeder, one or more of the other nodes, or both, and the hash code or checksum found in the torrent file for such a software update.

The aforementioned method 200 has been described with reference to a tracker-type, torrent-based P2P system that employs a dedicated tracker to manage the torrent download and direct the clients to the peers they use to obtain the data pieces identified in each torrent file. In such a tracker-type P2P system, because the CM service provider provides and maintains the torrent file, its associated tracker, and the initial seeder for its announced CM service (e.g., CM host 160), it exhibits centralized control over the distribution of the software update to clients in the system 100 to ensure that those clients receiving the announced CM service are indeed valid clients. It also provides assurance that those valid clients become valid seeders listed in a valid tracker once they have received all or a part of the CM service. These subsequently-turned seeders are listed as valid sources in the associated tracker as maintained by the CM service provider. Thus, any authorized client that receives an announced CM service is able to trust the source or sources of the CM service as listed in the associated tracker, whether such a source is an initial seeder, as provided and maintained by the CM service provider (e.g., a CM host 160), or one of the subsequently-turned seeders (e.g., one or more of the nodes 110a-n).

With minor modifications, the system 100 (FIG. 1) and method 200 (FIGS. 2a-b) are also applicable for a trackerless, torrent-based P2P system, wherein there is no dedicated tracker associated a torrent file. In practice, a trackerless system, such as the BitTorrent trackerless system, makes every client a lightweight tracker. A protocol, based on a Kademlia distributed hash table (DHT), is then employed instead of a dedicated tracker to allow clients to efficiently store and retrieve contact information for peers in a swarm or torrent community to download content. In one embodiment that employs a trackerless torrent-based P2P scheme within the system 100, an authentication host is employed to provide centralized authentication of the CM service being provided through the P2P scheme. The dedicated host may be a part of one of the CM hosts 160-190 or separate from those hosts.

FIG. 3 illustrates a method 300 for employing a trackerless, torrent-based P2P distribution model or system to provide CM services in a desired network system, in accordance with one embodiment. From 302 to 314, the method 300 follows the method 200 from 202 to 314, respectively.

At 316, however, when the node 110a accesses information from the identified torrent file in the aforementioned authentication host to obtain download information for the CM service, the torrent file will not point to a dedicated tracker as in 216. Instead, the torrent file directs the node 110a to access, for example, a Kademlia DHT as noted earlier to identify those peers in the torrent community that serve as seeders for an announced CM service.

At 318, because the seeders are not being identified from a valid tracker, an authorized client such as node 110a then communicates with the authentication host to verify or authenticate that the source(s), or seeder(s), for the announced CM service are valid.

At 320, once the seeders are authenticated the node 110a obtains the CM service from the torrent-based P2P system based on the information found in the associated torrent file as in 218 of FIGS. 2a-b.

At 322, the node 110a also may validate the received CM service with the authentication host by comparing information from the received CM service with the metadata about the CM service that is found in the torrent file accessed at 316.

Figure 4:
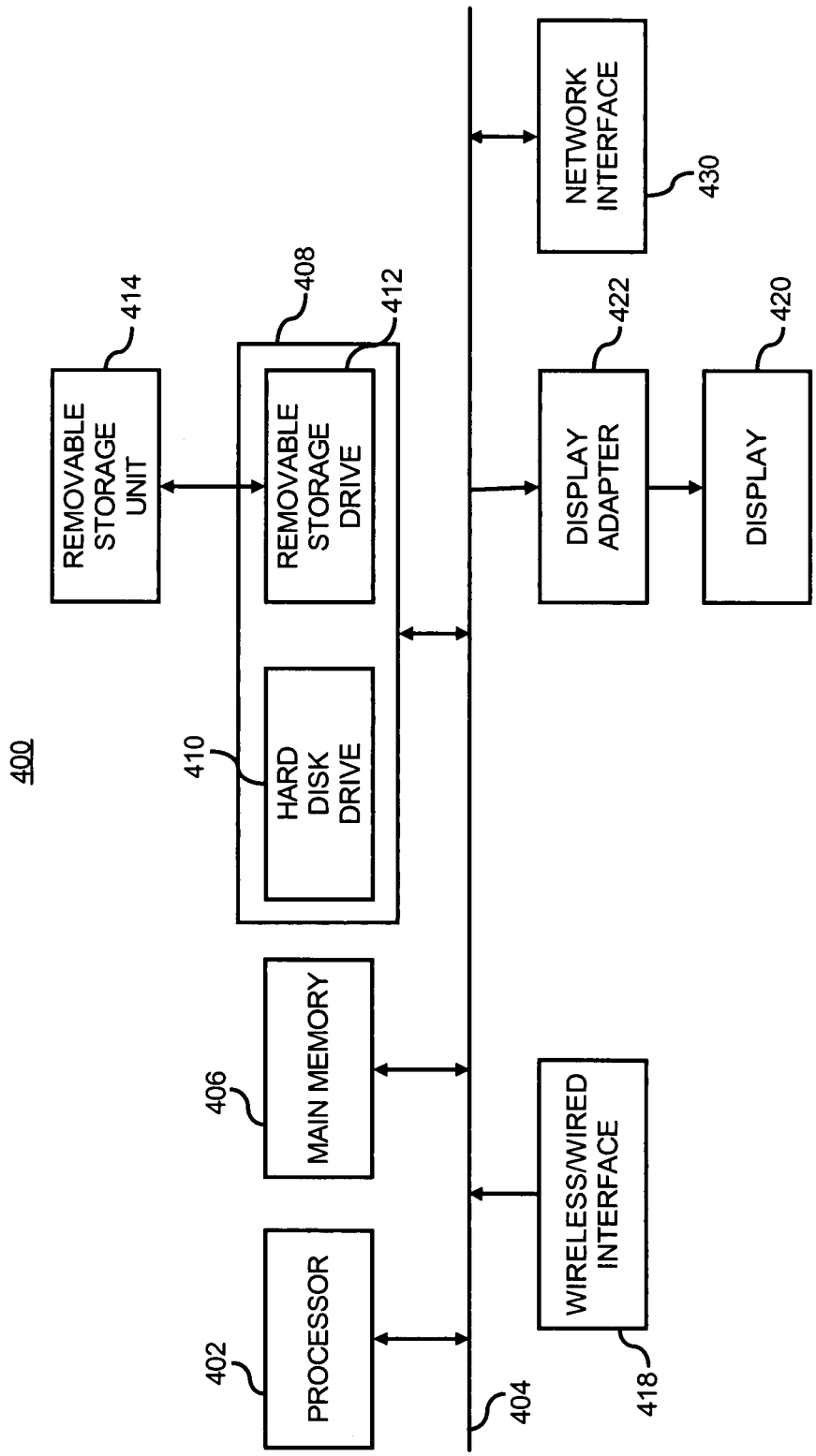
FIG. 4 illustrates a block diagram of a computerized system that is operable to be used as a platform for implementing one or more components in the system illustrated in FIG. 1 and one or more methods illustrated in FIGS. 2 and 3.

FIG. 4 illustrates a block diagram of a computerized system 400 that is operable to be used as a platform for implementing any of the CM hosts 160-190 or nodes 110a-n and methods 200 and 300. It should be understood that a more sophisticated computerized system is operable to be used. Furthermore, components may be added or removed from the computerized system 400 to provide the desired functionality.

The computer system 400 includes one or more processors, such as processor 402, providing an execution platform for executing software. Thus, the computerized system 400 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 402 are communicated over a communication bus 404. The computer system 400 also includes a main memory 406 where software is resident during runtime, and a secondary memory 408. The secondary memory 408 may also be a computer-readable medium (CRM) that may be used to store software programs, applications, or modules that implement the methods 200 and 300, or parts thereof. The main memory 406 and secondary memory 408 (and an optional removable storage unit 414) each includes, for example, a hard disk drive and/or a removable storage drive 412 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 400 includes a display 420 connected via a display adapter 422, user interfaces comprising one or more input devices 418, such as a keyboard, a mouse, a stylus, and the like. However, the input devices 418 and the display 420 are optional. A network interface 430 is provided for communicating with other computer systems via, for example, the network 120.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A peer-to-peer (P2P) system for providing a change management (CM) service to at least one client therein, comprising:
    a syndication feed operable to provide a notification of the CM service to the at least one client, wherein the CM service is to change a software configuration of the at least one client;
    a host operable to provide the CM service to the at least one client in the P2P system;
    the at least one client is operable to receive the syndication feed, determine whether the received syndication feed is authentic and, based on the syndication feed determined to be authentic, determine from information in the notification describing the CM service whether the CM service notified through the syndication feed is a CM service that is to be performed by the at least one client;
    if the CM service notified through the syndication feed is determined to be the CM service that is to be performed by the at least one client, the at least one client is operable to send a request to the host for the CM service;
    wherein the host is operable to receive the request from the at least one client and, based on a download policy, selectively download the requested CM service to the client or, based on a threshold number of downloads having occurred of the CM service, redirect the at least one client to another client in the P2P system for the requested CM service; and
    wherein the P2P system is a torrent-based P2P system and wherein the syndication feed provides location information of the CM service in a torrent file, and the syndication feed provides information about the torrent file to the at least one client to enable the at least one client to receive the CM service;
    wherein each torrent file corresponds to a change in software configuration.

2. The P2P system of claim 1, wherein the at least one client is a subscriber of the syndication feed to receive the CM service notification.

3. The P2P system of claim 1, wherein the syndication feed is an XML-structured feed.

4. The P2P system of claim 3, wherein the XML-structured feed is one of: an Atom feed, a really simple syndication (RSS) feed, a rich site summary feed, and a resource description framework (RDF) site summary feed.

5. The P2P system of claim 1, wherein the CM service is a software update.

6. The P2P system of claim 1, wherein the at least one client includes a plurality of clients that are peers in the P2P system, wherein a first one of the plurality of clients is operable as a source in the P2P system to provide the CM service to the remaining ones of the plurality of clients once the first one receives at least a part of the CM service from the at least one host.

7. The system of claim 1, wherein the determination that the CM service notified through the syndication feed is to be performed by he at least one client is based on at least one of local node configuration, local node environment, and automation policy and administrative command.

8. A method for providing at least one change management (CM) service to a plurality of clients in a network system, comprising:
    storing a first CM service at a first CM host;

creating a first torrent file for distribution of the first CM service to the plurality of clients through a torrent-based P2P system;
publishing a first notification of the first CM service to the plurality of clients through a syndication feed;
receiving a request for the first CM service from a first one of the plurality of clients that is notified of the first CM service in response to the first one of the plurality of clients determining from information in the published first notification describing the first CM service, and that the first CM service identified from the published first notification is a CM service that is to be performed by the first one of the plurality of clients, and in response to the first one of the plurality of clients identifying the first torrent file for downloading the first CM service using the published first notification;
determining whether a threshold number of downloads of the first CM service has occurred by the first CM host;
based on a number of downloads exceeding the threshold number, directing the first one of the plurality of clients to another client in the torrent-based P2P system to obtain the first CM service; and
based on the number of downloads not exceeding the threshold number, providing the first CM service from the first CM host to the first the first one of the plurality of clients through the torrent-based P2P system in accordance with the first torrent file;
  wherein publishing the first notification of the first CM service to the plurality of clients through the syndication feed comprises providing in the first notification a prerequisite for the plurality of clients to receive another syndication feed for another CM service before receiving the first CM service.

9. The method of claim 8, further comprising:
providing the first CM service from a second one of the plurality of clients to the first client through the torrent-based P2P system in accordance with the first torrent file.

10. The method of claim 9, further comprising:
providing authentication of the first CM host and the second client as valid sources of the first CM service.

11. The method of claim 10, further comprising:
providing authentication of the first CM service as received by the first client from at least one of the first CM host and the second client.

12. The method of claim 9, further comprising:
providing at least a part of the first CM service from the first CM host to the second client through the torrent-based P2P system in accordance with the first torrent file prior to providing the first CM service from the second client to the first client.

13. The method of claim 8, further comprising:
also storing the first CM service at a mirror site of the first CM host.

14. The method of claim 8, further comprising:
storing a second CM service at a second CM host;
creating a second torrent file for distribution of the second CM service to the plurality of clients through the torrent-based P2P system;
publishing a second notification of the second CM service to the plurality of clients through a syndication feed;
receiving a request for the second CM service from one of the plurality of clients that is notified of the second CM service; and
providing the second CM service from the second CM host to the one client through the torrent-based P2P system in accordance with the second torrent file.

15. The method of claim 8, wherein the first CM service is a first software update, and providing in the first notification a prerequisite comprises:
providing in the first notification the prerequisite for the plurality of clients to receiving another syndication feed for a second software update before receiving the first software update.

16. The method of claim 8, wherein the determining from information in the published first notification describing the first CM service identified from the published first notification is a CM service is made based on at least one of local node configuration, local node environment, and automation policy and administrative command of the first one of the plurality of clients.

17. A computer readable storage device on which is encoded program code for providing at least one change management (CM) service to a plurality of clients in a network system, the encoded program code comprising:
program code for storing a first CM service at a first CM host;
program code for creating a first torrent file for distribution of the first CM service to the plurality of clients through a torrent-based P2P system;
program code for publishing a first notification of the first CM service to the plurality of clients through a syndication feed;
program code for receiving a request for the first CM service from a first one of the plurality of clients that is notified of the first CM service in response to the first one of the plurality of clients determining from information in the published first notification describing the first CM service, and that the first CM service identified from the published first notification is a CM service that is to be performed by the first one of the plurality of clients, and in response to the first one of the clients identifying the first torrent file for downloading the first CM service using the published first notification;
program code for determining whether a threshold number of downloads of the first CM service has occurred by the first CM host;
program code for, based on the number of downloads exceeding the threshold number, directing the first one of the plurality of clients to another client in the P2P system to obtain the first CM service; and
program code for, based on the number of downloads not exceeding the threshold number, providing the first CM service from the first CM host to the first one of the plurality of clients through the torrent-based P2P system in accordance with the first torrent file;
  wherein the program code for publishing the first notification of the first CM service to the plurality of clients through the syndication feed comprises program code for providing in the first notification a prerequisite for the plurality of clients to receive another syndication feed for another CM service before receiving the first CM service.

* * * * *

UNITED STATES PATENT AND TRADEMARK OFFICE
CERTIFICATE OF CORRECTION

PATENT NO.         : 8,560,654 B2                                         Page 1 of 1
APPLICATION NO.    : 11/701689
DATED              : October 15, 2013
INVENTOR(S)        : Jeffery A. Morgan et al.

It is certified that error appears in the above-identified patent and that said Letters Patent is hereby corrected as shown below:

On the title page, in item (73), Assignee, in column 1, line 2, delete "Company," and insert
-- Company, L.P., --, therefor.

In the Claims

In column 10, line 38, in Claim 1, after "service;" insert -- and --.

In column 10, line 59, in Claim 7, after "The" insert -- P2P --.

In column 11, line 26, in Claim 8, after "host to" delete "the first".

Signed and Sealed this
Thirty-first Day of December, 2013

Margaret A. Focarino
*Commissioner for Patents of the United States Patent and Trademark Office*